United States Patent
Allen et al.

(10) Patent No.: US 10,528,708 B2
(45) Date of Patent: Jan. 7, 2020

(54) PREVENTION OF UNAUTHORIZED RESOURCE UPDATES

(71) Applicant: INTERNATIONAL BUSINESS MACHINES CORPORATION, Armonk, NY (US)

(72) Inventors: Michael J. Allen, Endicott, NY (US); Brent J. Boisvert, Vestal, NY (US); Michael S. Bomar, Endicott, NY (US); John D. Eggleston, Vestal, NY (US); Ruben O. Manso, Vestal, NY (US); Brian D. Valentine, Endicott, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 202 days.

(21) Appl. No.: 15/381,625

(22) Filed: Dec. 16, 2016

(65) Prior Publication Data

US 2018/0173857 A1    Jun. 21, 2018

(51) Int. Cl.
| | |
|---|---|
| *G06F 21/10* | (2013.01) |
| *G06F 8/65* | (2018.01) |
| *H04L 29/06* | (2006.01) |
| *G06F 21/60* | (2013.01) |

(52) U.S. Cl.
CPC ............ *G06F 21/10* (2013.01); *G06F 8/65* (2013.01); *G06F 21/602* (2013.01); *H04L 63/10* (2013.01); *H04L 63/0428* (2013.01); *H04L 63/068* (2013.01); *H04L 63/0876* (2013.01)

(58) Field of Classification Search
CPC . G06F 21/10; G06F 8/65; G06F 21/57; H04L 63/0428; H04L 63/0876; H04L 63/10
See application file for complete search history.

(56) References Cited

U.S. PATENT DOCUMENTS

| | | | | |
|---|---|---|---|---|
| 6,167,567 | A * | 12/2000 | Chiles | G06F 9/454 717/173 |
| 6,247,168 | B1 * | 6/2001 | Green | G06F 8/60 700/17 |
| 8,132,015 | B1 | 3/2012 | Wyatt | |
| 8,245,219 | B2 * | 8/2012 | Agarwal | G06F 8/65 717/168 |

(Continued)

OTHER PUBLICATIONS

Technet., "Business Hours vs. Maintenance Windows with System Center 2012 Configuration Manager". Mar. 2012, http://blogs.technet.com/b/server-cloud/archive/2012/03/28/business-hours-vs-maintenance-windows-with-system-center-2012-configuration-nnanager.aspx (Year: 2012).*

*Primary Examiner* — Robert B Leung
*Assistant Examiner* — Carlos M De Jesus Lassala
(74) *Attorney, Agent, or Firm* — Cantor Colburn LLP; Edward Wixted

(57) ABSTRACT

Embodiments include method, systems and computer program products for preventing unauthorized resource updates. In some embodiments, it may be determined that a mainframe computer is not within a service period. A control file may be obtained and decrypted. Using the decrypted control file, the mainframe computer may be determined to be authorized. An available resource update file may be selected based on a determination that the mainframe computer is authorized. An update to a resource of the mainframe computer may be facilitated based on the available resource update file.

17 Claims, 4 Drawing Sheets

(56) References Cited

U.S. PATENT DOCUMENTS

| | | | |
|---|---|---|---|
| 8,924,950 B2* | 12/2014 | McDonald | G06F 8/65 |
| | | | 709/203 |
| 9,075,688 B2* | 7/2015 | Challa | G06F 8/65 |
| 9,235,402 B2* | 1/2016 | Carpenter | G06F 9/44505 |
| 9,916,234 B1* | 3/2018 | Norton | G06F 11/3692 |
| 2003/0041127 A1* | 2/2003 | Turnbull | G06F 8/65 |
| | | | 709/220 |
| 2004/0267586 A1* | 12/2004 | McDougal | G06Q 10/0631 |
| | | | 705/7.37 |
| 2005/0223373 A1* | 10/2005 | Gage | G06F 8/654 |
| | | | 717/168 |
| 2005/0257215 A1* | 11/2005 | Denby | G06F 8/65 |
| | | | 717/172 |
| 2006/0174242 A1* | 8/2006 | Zhu | G06F 8/65 |
| | | | 717/172 |
| 2007/0076885 A1* | 4/2007 | Sood | H04L 63/123 |
| | | | 380/270 |
| 2007/0250830 A1* | 10/2007 | Holmberg | G06F 8/65 |
| | | | 717/171 |
| 2012/0007910 A1 | 1/2012 | Lee | |
| 2013/0217336 A1 | 8/2013 | McCormack et al. | |
| 2013/0311982 A1* | 11/2013 | Lal | G06F 8/65 |
| | | | 717/172 |
| 2013/0339734 A1* | 12/2013 | Vernia | H04L 63/0428 |
| | | | 713/168 |
| 2014/0201728 A1* | 7/2014 | Du Toit | G06F 8/65 |
| | | | 717/171 |
| 2014/0217166 A1* | 8/2014 | Berthiaume | G06F 21/57 |
| | | | 235/375 |
| 2014/0351584 A1 | 11/2014 | Checcucci et al. | |

* cited by examiner

PREVENTION OF UNAUTHORIZED RESOURCE UPDATES

BACKGROUND

The present disclosure relates to data processing, and more specifically, to methods, systems and computer program products for preventing unauthorized resource updates on mainframe computers.

Mainframe computers are high-powered computers primarily utilized by large organizations for bulk data processing. Mainframe computers may be used to host commercial databases, transaction servers, and applications that require greater security and availability than smaller-scale computing devices.

SUMMARY

In accordance with an embodiment, a method for prevention of unauthorized resource updates is provided. The method may include determining that a mainframe computer is not within a service period. A control file may be obtained. The control file may be decrypted. Using the decrypted control file, it may be determined that the mainframe computer is authorized. An available resource update file may be selected based on a determination that the mainframe computer is authorized. An update to a resource of the mainframe computer may be facilitated based on the available resource update file.

In another embodiment, a computer program product may comprise a non-transitory storage medium readable by a processing circuit that may store instructions for execution by the processing circuit for performing a method that may include determining that a mainframe computer is not within a service period. A control file may be obtained. The control file may be decrypted. Using the decrypted control file, it may be determined that the mainframe computer is authorized. An available resource update file may be selected based on a determination that the mainframe computer is authorized. An update to a resource of the mainframe computer may be facilitated based on the available resource update file.

In another embodiment, a system may include a processor in communication with one or more types of memory. The processor may be configured to determine that a mainframe computer is not within a service period. A control file may be obtained. The control file may be decrypted. Using the decrypted control file, it may be determined that the mainframe computer is authorized. An available resource update file may be selected based on a determination that the mainframe computer is authorized. An update to a resource of the mainframe computer may be facilitated based on the available resource update file.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for preventing unauthorized resource updates are provided. The methods and systems described herein are directed to preventing users of mainframes, such as customers and third-party maintainers from retrieving software updates they are not authorized to access. Resource updates, such as firmware updates and/or software updates for mainframe computers, are often available through software packages stored on read-only media.

In some embodiments, a customer or third-party maintainer may utilize a support element to monitor and operate mainframe functionality. A support element may be a dedicated computing device, such as a workstation, desktop, server, laptop, tablet, or the like. The support element may determine whether the mainframe computer is within a service period. If the support element determines that the mainframe computer is within the service period, then the support element may facilitate an update to a resource of the mainframe computer using a file from a software package stored on the read-only media.

In some embodiments, the support element may determine that the mainframe is not within the service period. If the support element determines that the mainframe is not within the service period, then the support element may obtain an encrypted control file from the read-only media. Using information obtained from the encrypted control file, the support element may determine that the mainframe computer is authorized to update one or more resources using the software package stored on the read-only media. Accordingly, the systems and methods described herein prevent someone from using the software package stored on the read-only media to update a different mainframe computer. The systems and methods described herein may also prevent a user from leveraging a previous authorization on a read-only media on a newer software package release for which the user does not have authorization to use.

The systems and methods described herein provide the flexibility for mainframe computing systems within a service period while restricting those that are outside the service period, which protects against users who may attempt to share resource updates amongst machines that are outside the service period and against users from adding service to a read-only memory upon which the resource updates files are stored. Additionally, encrypting only the control file, which contains data necessary to authorize a mainframe computer, rather than the entire resource update files library stored on the read-only memory, makes it less expensive to produce the read-only memory for distribution to authorized users.

Figure 1:
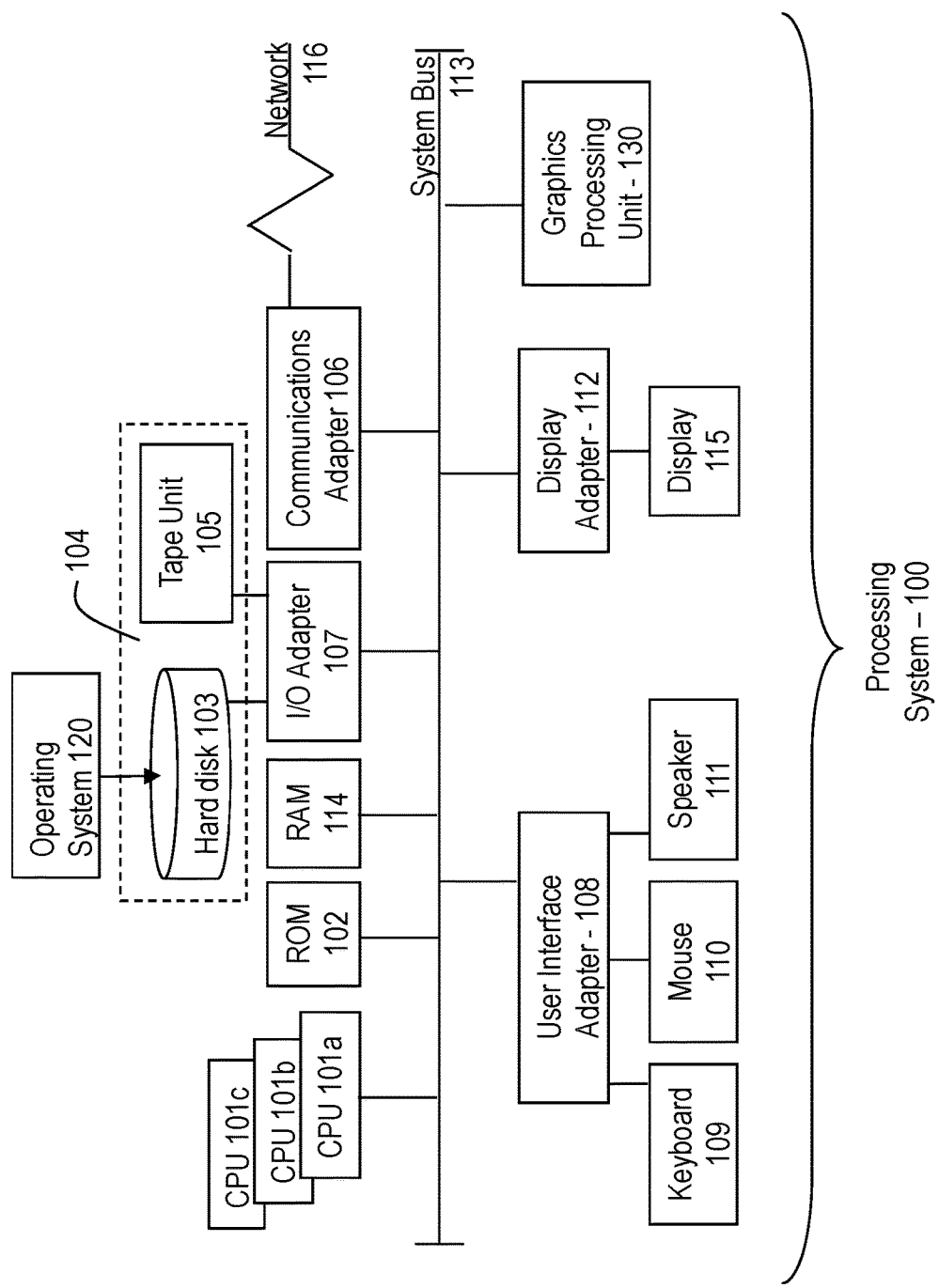
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A communications adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
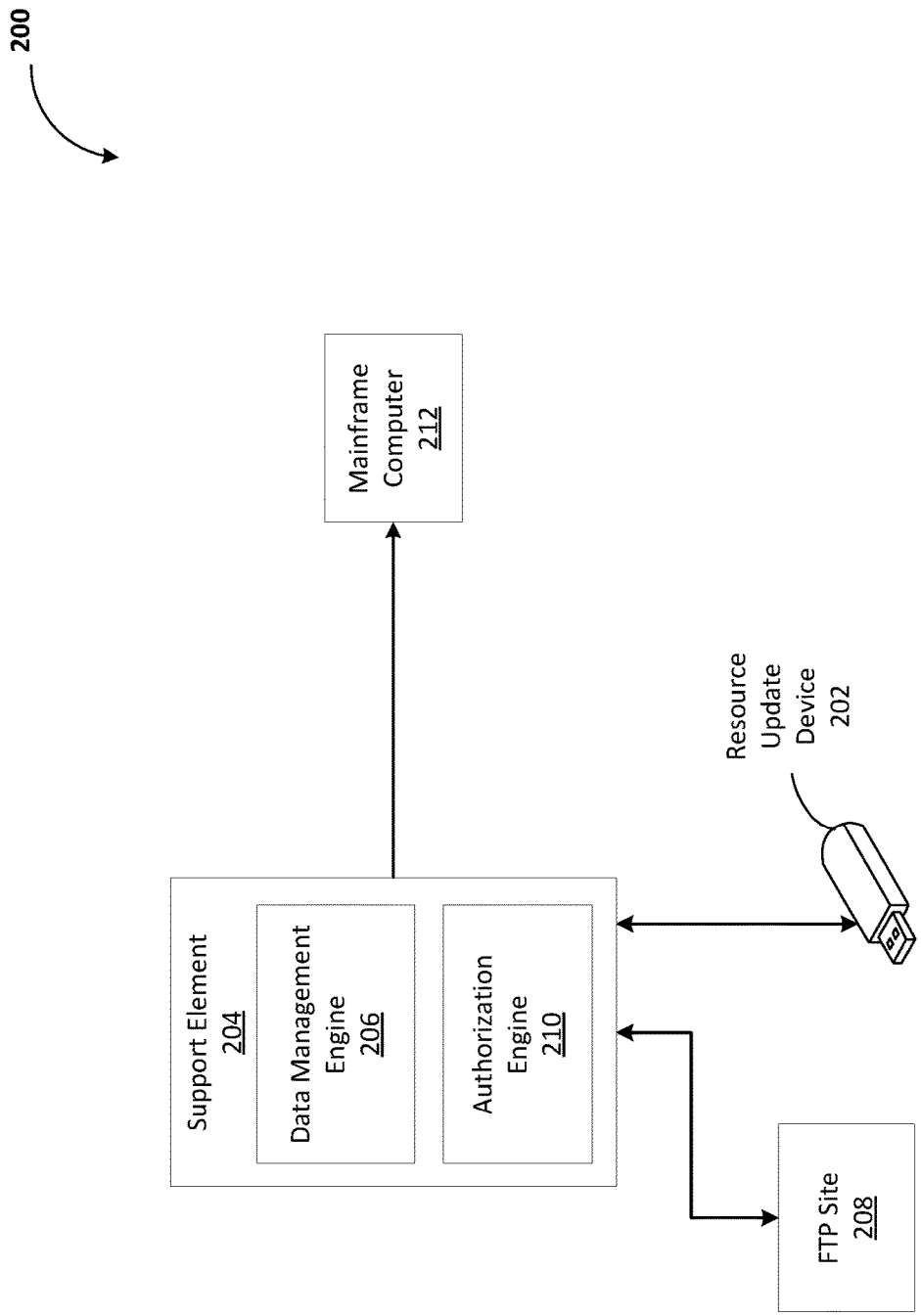
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, resource update device 202, a support element 204, and/or a mainframe computer 212.

The resource update device 202 may be a read-only memory device, such as a universal serial bus (USB) flash drive, CD-ROM, DVD-ROM, or the like. The resource update device 202 may include a resource update package. The resource update device 202 may also contain a control file that may be used by the support element 204 to authorize update of a resource of the mainframe computer 212. In some embodiments, the resource update package and the control file may accessible through a file transfer protocol (FTP) site 208. In some embodiments, a request may be received by the manufacturer of the mainframe computer 212, requesting a resource update package. In some embodiments, this request may be by email, phone, chat, or other communication line. The request may include a serial number identifying the mainframe computer 212 and an indication of the available resource update files. In response to receiving the request, a control file may be generated to authorize update of the resource of the mainframe computer 212, such as via a firmware or software update. The control file may be encrypted and stored on the resource update device 202 with resource update files that may be used to update a resource of the mainframe computer 212.

The support element 204 may be any type of computing device, such as a computer, laptop, tablet, smartphone, wearable computing device, server, etc. The support element 204 may be able to execute applications for monitoring and operating the mainframe computer 212. The support element 204 may include a data management engine 206 and/or an authorization engine 210.

The data management engine 206 may include computer-readable instructions that in response to execution by the processor(s) 101, cause operations to be performed including detecting a resource update device 202 and determining whether the mainframe computer 212 is within a service period. In some embodiments, the data management engine 206 may identify an expiration date associated with a service period of the mainframe computer 212. The data management engine 206 may obtain a current date and compare the date with the expiration date associated with the service period of the mainframe computer 212. If the current date is before the expiration date, then the data management engine 206 may determine that the mainframe computer 212 is within a service period. The data management engine 206 may then access the resource update package from the resource update device 202 and use a resource update file from the resource update package to update a resource of the mainframe computer 212.

If the current date is after the expiration date, the data management engine 206 may determine that the mainframe computer 212 is not within the service period. The data management engine 206 may then notify the authorization engine 210 that the mainframe computer 212 is outside the service period.

The authorization engine 210 may include computer-readable instructions that in response to execution by the processor(s) 101, cause operations to be performed including obtaining the control file from the resource update device 202. In some embodiments, if the resource update package is available via an FTP site 208, the authorization engine 210 may obtain the control file from the FTP site 208. The authorization engine 210 may decrypt the control file using an encryption key. In some embodiments, the authorization engine 210 may obtain an authorized serial number from the control file and compare it with the serial number associated with the mainframe computer 212. If the authorized serial number and the serial number associated with the mainframe computer 212 match, then the authorization engine 210 may permit the support element 204 to access one or more resource update files from the resource update package using the indication of available resource update files obtained from the control file.

In some embodiments, the system may include a mainframe computer 212 that is monitored and controlled by the support element 204. The mainframe computer 212 may be any type of data processing system capable of high-volume, processor-intensive computing.

Figure 3:
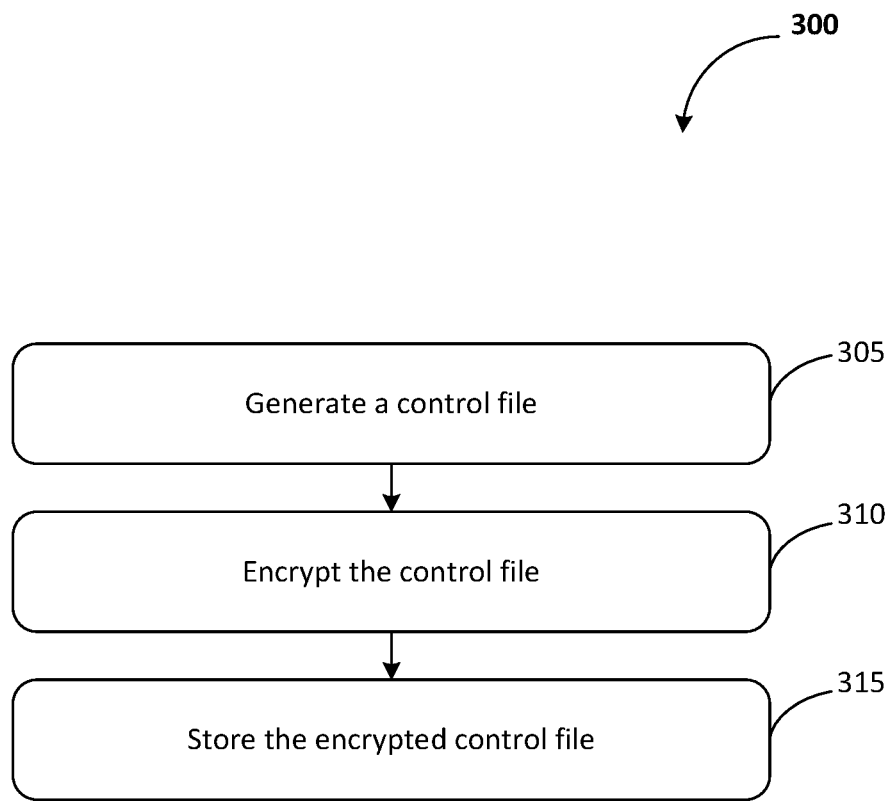
FIG. 3 is a flow diagram of a method for generating control files used in preventing unauthorized resource updates in accordance with an exemplary embodiment.

Now referring to FIG. 3, a flow diagram of a method 300 for generating control files used in preventing unauthorized resource updates in accordance with an exemplary embodiment is depicted. At block 305, a control file is generated. In some embodiments, a system may receive a request for a resource update package. The request may include identification of a mainframe computer 212 and additional information, such as the type of computer or a user or support element 204 associated with the mainframe computer 212.

The system may generate a control file that includes identification of an authorized serial number (e.g., serial number of the authorized mainframe computer 212). This may prevent a user or third party maintainer from using the resource update package to update a different mainframe computer. The control file may also include an indication of the resource update files that may be used to update a resource of the mainframe computer 212.

At block 310, the control file is encrypted. The control file may be encrypted using an encryption key. In some embodiments, the encryption key may have previously been included in a driver for the mainframe computer 212. Accordingly, the mainframe computer 212 has access to the encryption key used to encrypt the control file via the driver.

At block 315, the control file is stored. In some embodiments, the control file may be stored on a read-only resource update device 202, such as a USB flash drive, CD-ROM, DVD-ROM or the like. The resource update device 202 may be transmitted to the user or third party maintainer that interacts with the support element 204 and requested the resource update package. In some embodiments, the resource update package may be stored to and made available from an FTP site 208. The access credentials may be transmitted to the user or third party maintainer via communications, such as email, text, letter, or the like.

Figure 4:
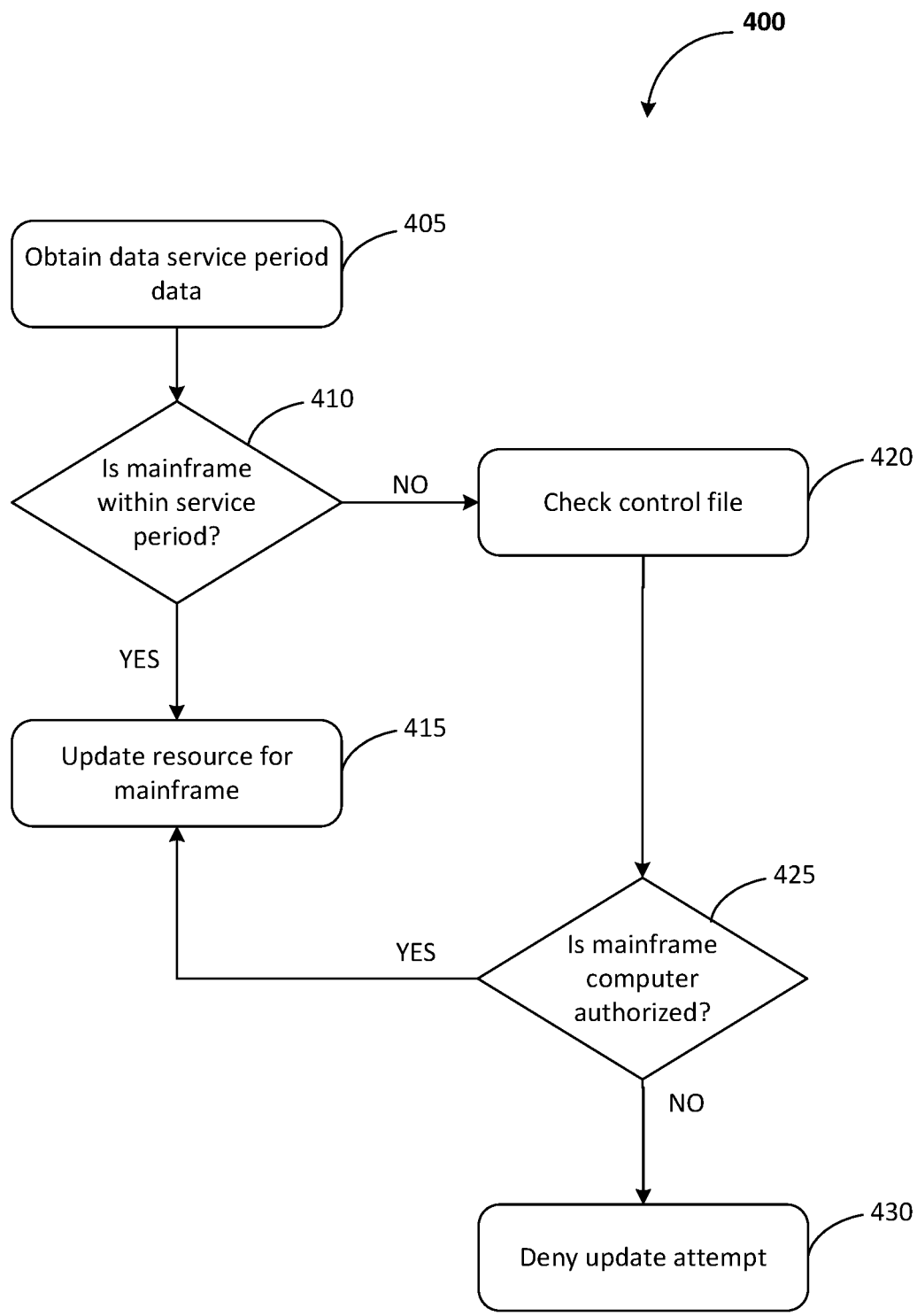
FIG. 4 is a flow diagram of a method for preventing unauthorized resourced updates in accordance with an exemplary embodiment.

Now referring to FIG. 4, a flow diagram of a method 400 for preventing unauthorized resourced updates in accordance with an exemplary embodiment is depicted. At block 405, service period data may be obtained. In some embodiments, the service period data may be an expiration date associated with the service period of the mainframe computer 212. The service period data may be stored on the support element 204 or the mainframe computer 212.

At block 410, a determination is made whether the mainframe computer 212 is within a service period. In some embodiments, the data management engine 206 may compare the expiration date associated with a mainframe computer 212 with a current date. The data management engine 206 may determine whether the current date is before or after the expiration date associated with the service period of the mainframe computer 212.

If the mainframe computer 212 is within the service period, then the method may proceed to block 415. At block 415, the resource update package may be obtained from the resource update device 202. In some embodiments, the resource update package may be obtained from an FTP site 208. The authorization engine 210 may enable update of a resource of the mainframe computer 212 using resource update files from the resource update package.

If the mainframe computer 212 is not within the service period, the method may proceed to block 420. At block 420, the authorization engine 210 may obtain the control file from the resource update device 202. Alternatively, the authorization engine 210 may obtain the control file from a designated FTP site 208.

At block 425, the authorization engine 210 may determine whether the mainframe computer 212 is authorized. In some embodiments, the authorization engine 210 may obtain an encryption key. In some embodiments, the encryption key may be obtained from a previously installed driver. The encryption key may be used to decrypt the control file. The authorization engine 210 may obtain an authorized serial number from the control file. The authorization engine 210 may also obtain the serial number of the mainframe computer 212. In some embodiments, the serial number of the mainframe computer 212 may be obtained from the support element 204 or the mainframe computer 212. The authorization engine 210 may compare the authorized serial number from the control file and the serial number of the mainframe computer 212. If the authorized serial number from the control file and the serial number of the mainframe computer 212 do not match, the method may proceed to block 430, where the attempt to access the resource update package is denied.

If the authorized serial number from the control file and the serial number of the mainframe computer 212 do match, the method may proceed to block 415, where the support element 204 is able to access the resource update files in the resource update package to update a resource of the mainframe computer 212. In some embodiments, the data management engine 206 may facilitate an update to a resource of the mainframe computer 212 by selecting an available resource update file using an indication of available resource update files from the control file and using the selected resource update file obtained from the resource update device 202 or FTP site 208.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for preventing unauthorized resource updates, the method comprising:
    obtaining an indication of available resource update files for mainframe computers;
    obtaining an authorized serial number;
    generating a control file comprising the indication of available resource update files for the mainframe computers and the authorized serial number;
    encrypting the control file using an encryption key;
    storing the encrypted control file and available resource update files to a read-only memory;
    determining, by a processor, that a mainframe computer is not within a service period;
    obtaining the encrypted control file of a resource update package, wherein the resource update package comprises the encrypted control file and the available resource update files;
    decrypting the encrypted control file;
    determining, using the decrypted control file, that the mainframe computer is authorized;
    selecting an available resource update file based on a determination that the mainframe computer is authorized; and
    facilitating an update to a resource of the mainframe computer based on the available resource update file.

2. The computer-implemented method of claim 1, wherein the encrypted control file and the available resource update files are stored on a universal serial bus (USB) flash drive.

3. The computer-implemented method of claim 1, wherein the encrypted control file and the available resource update files are available on a file transfer protocol (FTP) site.

4. The computer-implemented method of claim 1, wherein decrypting the encrypted control file further comprises:
    obtaining the encryption key from a driver associated with the mainframe computer, wherein the driver comprises the encryption key; and
    decrypting the encrypted control file using the encryption key from the driver to access the authorized serial number and the indication of available resource update files.

5. The computer-implemented method of claim 1, wherein determining that the mainframe computer is authorized further comprises:

determining that a serial number associated with the mainframe computer and the authorized serial number match.

6. The computer-implemented method of claim 1, wherein determining that the mainframe computer is not within the service period further comprises:
identifying an expiration date associated with the service period for the mainframe computer; and
determining that a current date is after the expiration date associated with the service period for the mainframe computer.

7. A computer program product comprising a non-transitory storage medium readable by a processing circuit and storing instructions for execution by the processing circuit for performing a method comprising:
obtaining an indication of available resource update files for mainframe computers;
obtaining an authorized serial number;
generating a control file comprising the indication of available resource update files for the mainframe computers and the authorized serial number;
encrypting the control file using an encryption key; and
storing the encrypted control file and available resource update files to a read-only memory;
determining that a mainframe computer is not within a service period;
obtaining the encrypted control file of a resource update package, wherein the resource update package comprises the encrypted control file and the available resource update files;
decrypting the encrypted control file;
determining, using the decrypted control file, that the mainframe computer is authorized;
selecting an available resource update file based on a determination that the mainframe computer is authorized; and
facilitating an update to a resource of the mainframe computer based on the available resource update file.

8. The computer program product of claim 7, wherein the encrypted control file and the available resource update files are stored on a universal serial bus (USB) flash drive.

9. The computer program product of claim 7, wherein the encrypted control file and the available resource update files are available on a file transfer protocol (FTP) site.

10. The computer program product of claim 7, wherein decrypting the encrypted control file further comprises:
obtaining the encryption key from a driver associated with the mainframe computer, wherein the driver comprises the encryption key; and
decrypting the encrypted control file using the encryption key from the driver to access the authorized serial number and the indication of available resource update files.

11. The computer program product of claim 7, wherein determining that the mainframe computer is authorized further comprises:

determining that a serial number associated with the mainframe computer and the authorized serial number match.

12. The computer program product of claim 7, wherein determining that the mainframe computer is not within the service period further comprises:
identifying an expiration date associated with the service period for the mainframe computer; and
determining that a current date is after the expiration date associated with the service period for the mainframe computer.

13. A system, comprising:
a hardware processor in communication with one or more types of memory, the processor configured to:
obtain an indication of available resource update files for mainframe computers;
obtain an authorized serial number;
generate a control file comprising the indication of available resource update files for mainframe computers and the authorized serial number;
encrypt the control file using an encryption key;
store the encrypted control file and available resource update files to a read-only memory;
determine that a mainframe computer is not within a service period;
obtain the encrypted control file of a resource update package, wherein the resource update package comprises the encrypted control file and the available resource update files;
decrypt the encrypted control file;
determine, using the decrypted control file, that the mainframe computer is authorized;
select an available resource update file based on a determination that the mainframe computer is authorized; and
facilitate an update to a resource of the mainframe computer based on the available resource update package.

14. The system of claim 13, wherein the encrypted control file and the available resource update files are stored on a universal serial bus (USB) flash drive.

15. The system of claim 13, wherein the encrypted control file and the available resource update files are available on a file transfer protocol (FTP) site.

16. The system of claim 13, wherein, to decrypt the control file, the processor is further configured to:
obtain the encryption key from a driver associated with the mainframe computer, wherein the driver comprises the encryption key; and
decrypt the encrypted control file using the encryption key from the driver to access the authorized serial number and the indication of available resource update files.

17. The system of claim 13, wherein, to determine that the mainframe computer is authorized, the processor is further configured to:
determine that a serial number associated with the mainframe computer and the authorized serial number match.

* * * * *